April 18, 1944.  S. PILUSO  2,346,782
METHODS OF MANUFACTURING APPLICATORS OR DAUBERS
Filed Aug. 22, 1942  4 Sheets-Sheet 1
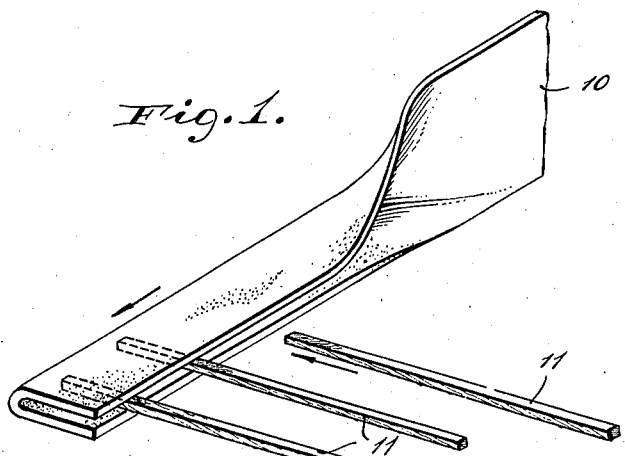
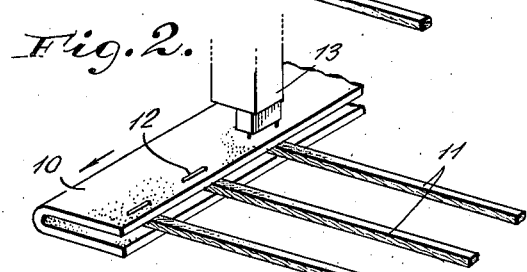
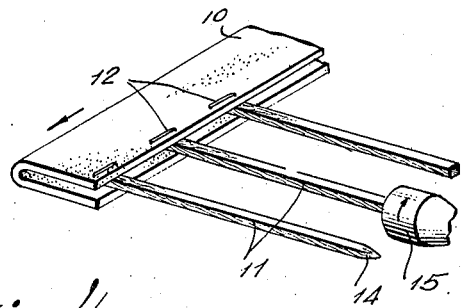
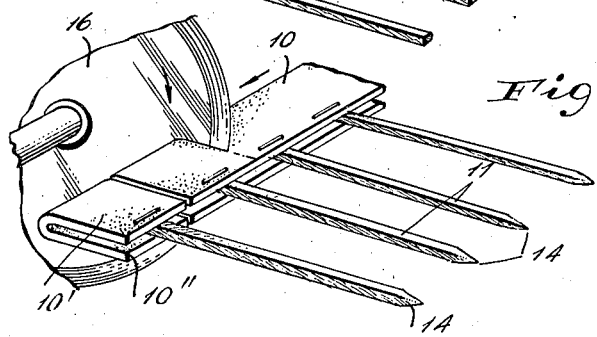
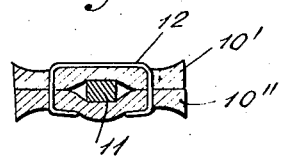
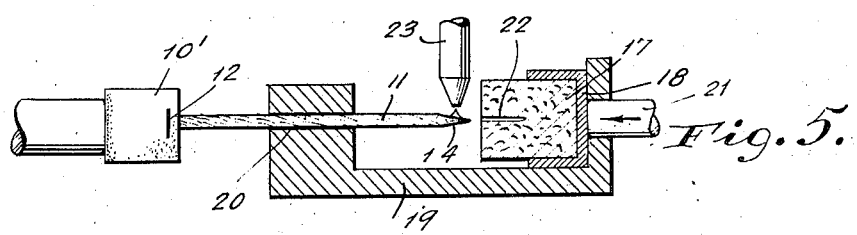
INVENTOR.
SEBASTIAN PILUSO
BY
Oscar A. Geier
ATTORNEY April 18, 1944.     S. PILUSO     2,346,782
METHODS OF MANUFACTURING APPLICATORS OR DAUBERS
Filed Aug. 22, 1942     4 Sheets-Sheet 2
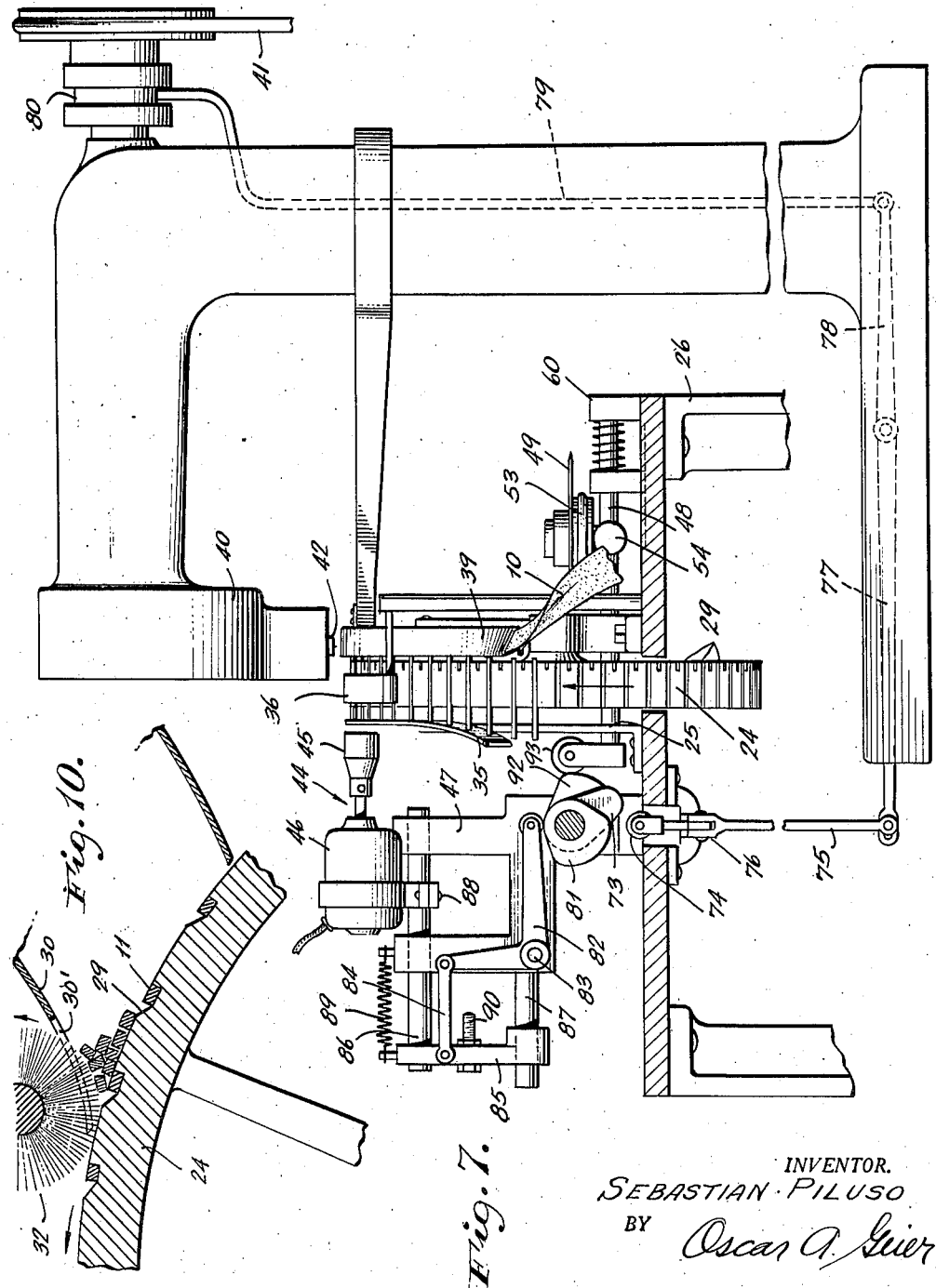
INVENTOR.
SEBASTIAN PILUSO
BY Oscar A. Geier
ATTORNEY April 18, 1944. S. PILUSO 2,346,782
METHODS OF MANUFACTURING APPLICATORS OR DAUBERS
Filed Aug. 22, 1942 4 Sheets-Sheet 3
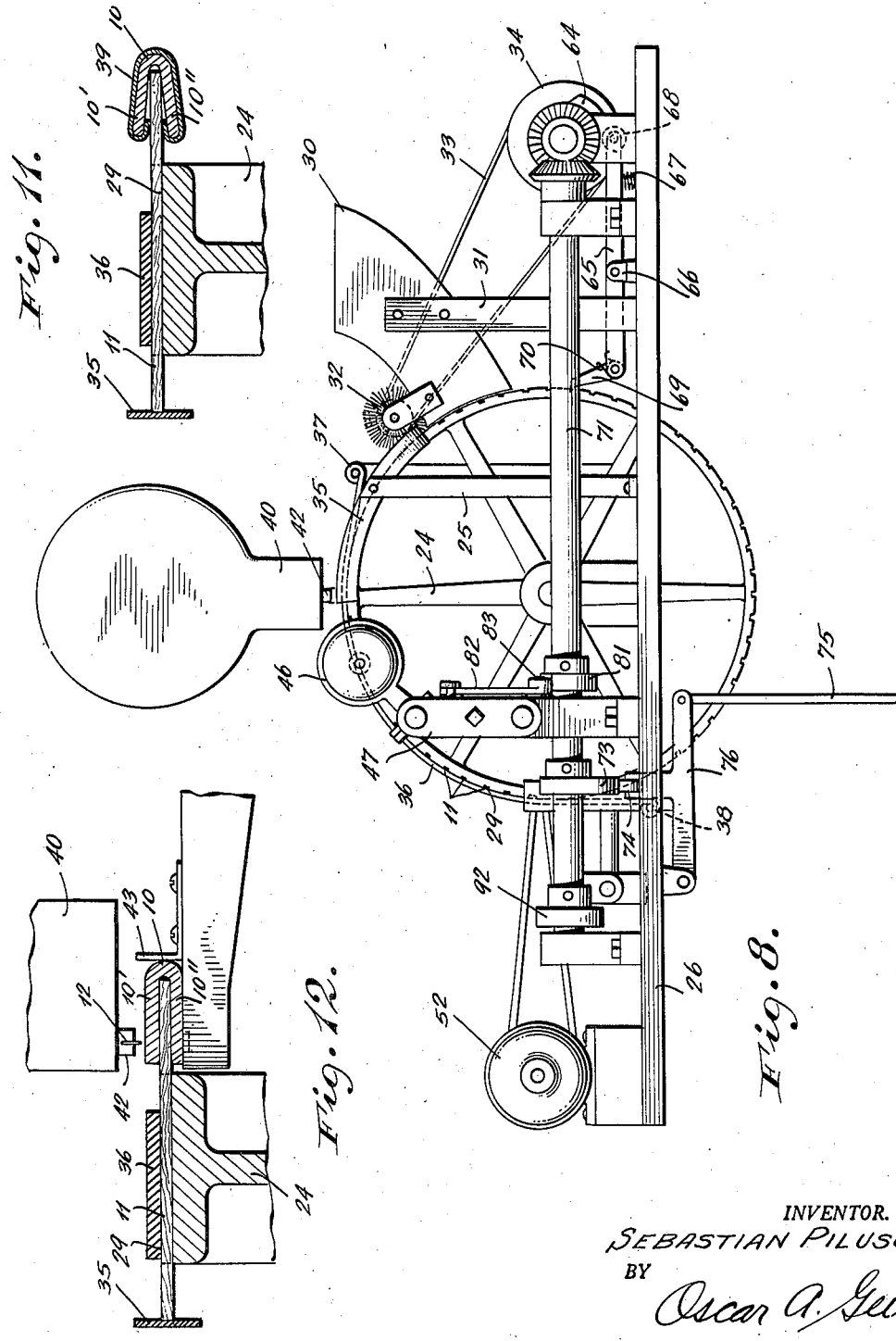
INVENTOR.
SEBASTIAN PILUSO
BY
Oscar A. Geier
ATTORNEY April 18, 1944.  S. PILUSO  2,346,782
METHODS OF MANUFACTURING APPLICATORS OR DAUBERS
Filed Aug. 22, 1942  4 Sheets-Sheet 4
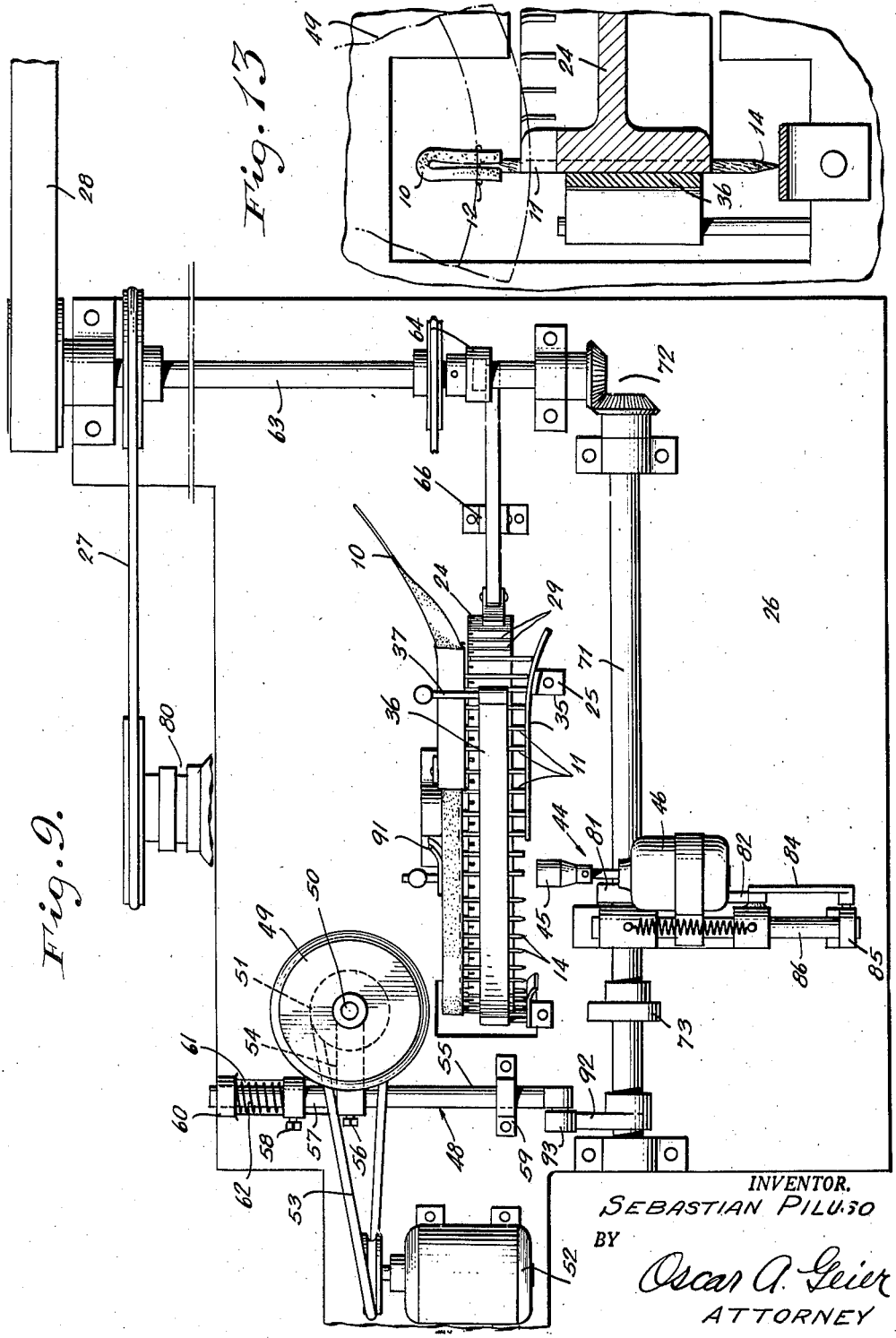
INVENTOR.
SEBASTIAN PILUSO
BY
Oscar A. Geier
ATTORNEY Patented Apr. 18, 1944

2,346,782

UNITED STATES PATENT OFFICE 2,346,782

METHOD OF MANUFACTURING APPLICATORS OR DAUBERS

Sebastian Piluso, Jersey City, N. J., assignor to Liberty Cork Co., Inc., Jersey City, N. J., a corporation of New Jersey Application August 22, 1942, Serial No. 455,821

8 Claims. (Cl. 300—21)

My invention relates to improvements in methods of manufacturing applicators or daubers for applying pasty and liquid masses and particularly to improvements in methods of manufacturing applicators or daubers for applying shoe polish to shoes of all kinds and other leather goods. My invention further relates to a machine for carrying out methods according to my invention.

One object of my invention is a method of manufacturing applicators or daubers by which such applicators or daubers can be produced in large quantities and in a very inexpensive manner.

Another more specific object of my invention is a method of manufacturing applicators of the class described which consists in folding strips of felt or similar absorbent material, in inserting sticks between the folds of the felt, in fastening handle sticks to the felt, in cutting the felt strip into pieces, each fastened to a stick and in attaching each stick with its felt pad to a bottle or can cover.

Another object of my invention is to provide a machine for carrying out the methods according to my invention and manufacturing applicators or daubers of the class described in mass production.

Another object of my invention is a machine for mass production of applicators which folds a strip of felt, inserts sticks between the folds of the felt, fastens the sticks to the strip, cuts the felt strip into pieces, each fastened to a stick and attaches each stick with its felt pad to a bottle or can cover such as a cork.

Other and further objects of my invention will hereinafter be set forth and the novel features thereof defined by the appended claims.

In the accompanying drawings, an embodiment of a machine for carrying out the methods according to my invention is shown.

Figure 1 shows the step of folding a strip of felt or similar absorbent material and the insertion of sticks between the fold of the felt strip;

Figure 2 shows the fastening of the sticks to the strip;

Figure 3 shows the pointing or sharpening of the sticks in preparation of the fastening of the can or bottle cover;

Figure 4 shows the cutting of the felt strip into individual pads;

Figure 5 shows the fastening of the sticks to a bottle or can cover;

Figure 6 shows a cross-section through pad and stick of an applicator on an enlarged scale;

Figure 7 is an elevational side view of a machine for carrying out the methods according to my invention;

Figure 8 is an elevational front view of a machine according to Figure 7;

Figure 9 is a plan view of a machine according to Figures 7 and 8;

Figures 10, 11, 12 and 13 show details of a machine according to Figures 7, 8 and 9 on an enlarged scale.

In accordance with my invention, I provide a strip of felt, cotton or similar absorbent material. As the first step of the method according to my invention, this strip is folded in longitudinal direction as indicated on the left side of Figure 1. The next step is to insert sticks 11 made of wood or other suitable material between the upper and lower sections of strip 10, as shown in Figure 1. The next step is to secure upper and lower sections of strip 10 to sticks 11. This can be accomplished by various conventional means, for example, by stitching. I have found it preferable to use staples 12 which can be fastened to strip 10 and sticks 11 by a conventional stapling machine 13.

The next step is to point or sharpen the ends 14 of sticks 11 in preparation of attaching the sticks to the cover of a can or bottle. The sticks can be pointed by any suitable means, for example, by a rotating sharpener 15.

The next step is to cut the felt strip 10 into individual pieces. Each of the pads thus formed is attached to a stick 11. Figure 4 shows individual pads and a cutting device which may comprise a revolving circular knife 16.

Figure 5 shows the step of securing a stick 11 bearing a pad to a cork 17 serving as cover of a bottle or can and partly encased by an outer cover 18, for example, made out of wood. Instead of using a cork, it is also possible to use any other suitable cover. In order to secure the stick to the cork, various means can be used. I have found it preferable to provide a frame 19 which serves as a guide for stick 11 by means of a hole or channel 20 and as a support or abutment for cork 17. Cork 17 is pushed by a pusher 21 onto stick 11, as illustrated in Figure 5. The penetration of cork 17 by stick 11 may be facilitated by providing a hole 22 in cork 17. The stick may be secured in hole 22 by dropping a drop of glue on point 14 of stick 11. The drop of glue may be released by a nozzle or funnel 23.

Figure 6 shows a section through the head or pad of a completed applicator.

The previous description and Figures 1 to 5 describe and illustrate the essential steps of a method according to my invention. I do not want to limit my invention to those steps but various changes may be made without leaving the scope of my invention. For example, the order of the steps illustrated in Figures 3 and 4 can be reversed. It it not always necessary to point or sharpen sticks 11; other means can be employed to secure the sticks to the cover. In certain cases, it will not be necessary to fasten the sticks to a cork or other cover but the stick itself can be used as a handle.

The different operations can be carried out by various, partly conventional means. I do not want my invention limited to any specific means for carrying out the individual steps. However, I have found it preferable to use a machine as illustrated in Figures 7 to 13 and hereinafter described.

A machine according to my invention comprises a rotating wheel 24 which is supported by standards 25 which, in turn, are carried by a frame 26. Wheel 24 is operatively connected with any suitable source of power by means of transmission belts 27 and 28 or by any other suitable means, for example, gear wheels. The periphery of wheel 24 is provided with a plurality of transverse recesses 29. Each of these recesses is dimensioned to accommodate one stick 11. Sticks 11 are fed to wheel 24 by means of a hopper 30 or a funnel which is carried by a standard 31 resting on frame 26. Sticks 11 when dumped into hopper 30 will lay themselves into individual recesses 29 and begin to travel with wheel 24. A rotating brush 32 whose bristles are in contact with the wheel periphery by extending through a slot 39' of hopper 30 may be provided in order to brush off all sticks which continue to travel with wheel 24 without having found space in one of the recesses 29. Brush 32 may be rotated by any suitable means, for example, a belt 33, connecting brush 32 with a rotated wheel 34.

In order to adjust sticks 11 accurately in their positions within recesses 29, a guiding rail 35 is provided which also serves as an abutment for the sticks. The sticks are secured within recesses 29 by guiding means 36 which follow closely the periphery of wheel 24 and retain sticks 11 within their recesses when the recesses move downward. Guiding means 36 may consist of a leather belt which is held by arms 37 and 38, respectively, and covers part of the periphery of wheel 24.

As absorbent material for the applicator a strip 10 made of cotton, felt or other suitable material is used. This strip is fed as a flat strip from any suitable source of supply to guiding and folding means 39. These guiding and folding means may consist of bent sheet metal and have a cross section, as indicated in Figure 12. As it is obvious from the drawings, the strip 10 after being fed into guiding means 33 will be folded in longitudinal direction, thus forming an upper section 10' and a lower section 10''. While strip 10 is gradually folded, guiding rail 35 will push sticks 11 between upper and lower sections 10' and 10'', respectively, until finally the position shown at the left side of Figure 1 is reached.

After a certain travel, sticks 11 and folded strip 10 reach stapling machine 40. This stapling machine may be of conventional design and connected over a transmission belt 41 with a suitable source of supply. The head 42 of the stapling machine will fasten each stick 11 to upper and lower section of folded strip 10 by pressing staples 12 through the various parts. The strip and sticks in their stapled condition are illustrated, for example, in Figure 2. The control of the stapling machine will be fully explained hereinafter.

Instead of using a stapling machine, it is also possible to use any other suitable means for fastening strip and sticks together, for example, a stitching or sewing machine.

After being stapled, sticks and strip 10 continue to travel together with wheel 24. Since the positions of the sticks on wheel 24 are fixed due to their insertion in recesses 29 the sticks will force strip 10 to follow the rotation of wheel 24 after the first stick has been securely stapled to strip 10. Consequently, it is not necessary to feed strip 10 continuously into the machine, but the machine is self-feeding after one or more sticks have been stapled to the strip.

Figure 12 illustrated the stapling of sticks on an enlarged scale. As this figure shows, a second abutment 43 secures each stick safely in its position while being stapled.

At a certain point of their travel, sticks and strip 10 reach the pointing or sharpening device 44. This device may be of conventional design. I have found it preferable to use a pointing or sharpening device having a revolving head 45 which engages the free end of each stick and gives it a point 14, as indicated in Figure 3. Revolving head 45 may be rotated by a motor 46 or any other suitable source of supply. Motor 46 is carried by a frame 47, preferably supported by standard 26. Timing and control of sharpening device 44 will be more fully explained hereinafter.

At a certain point, sticks 11 and strip 10 reach a cutting device 48 which cuts strip 10 in individual pads, as indicated in Figure 4. This cutting device comprises a circular knife 49 which is carried by a vertical shaft 50 to which is affixed a pulley 51. Pulley 51 is operatively connected with a motor 52 or any other suitable source of power by means of a transmission belt 53. Shaft 50 is carried by a horizontal arm 54 which is pivotally connected to a rod 55 and can be secured in any angular position relative to rod 55 by a set-screw 56. The pivotal connection of arm 54 with rod 55 comprises a sleeve or jacket 57 which is axially slidable on rod 55 and can be secured in any axial position on rod by a set-screw 58 in order to adjust the distance between the cutting edge of knife 49 and strip 10. Rod 55 is axially slidable in bearings 59 and 60. In order to prevent a tilting of rod 55 together with cutting knife 44 by a turning of rod 55 in its bearings 59 and 60, sleeve 57 is extended into a guiding slot 61. A spring 62 which is abutting against bearing 60 and sleeve 57 tends to move cutting knife 49 toward the wheel 24.

Figure 4 illustrates the operation of the cutting knife when cutting strip 10 into individual pads. Timing and control of the cutting device will be fully explained hereinafter.

Conveyor wheel 24 is rotated stepwise and intermittently. Such a stepwise and intermittent rotation can be accomplished by any suitable means. I have found it preferable to provide a shaft 63 which is operatively connected with a source of power by transmission belt 28. A cam 64 is fixed on shaft 63 by any suitable means, for example, by a key. Cam 64 actuates a rocker 65 which is pivotal about a pivot point 66. A spring 67 or other suitable means tends to press rocker 65 against cam 64. One end of rocker 65 is in operative contact with the cam and is preferably provided with a roller 68. The other end of rocker 65 carries a pawl 69. A spring 70 tends to press pawl 69 against wheel 24 and into one of recesses 29. It is obvious from the drawings, particularly from Figure 8, that the rocking movement of rocker 65, as operated by rotating cam 64, will cause a stepwise movement of wheel 24. Wheel 24 will stand still while roller 68 is not operated by cam 64.

The stapling device, the sharpening device and the cutting device are controlled by means of a master shaft 71 and cams carried by shaft 71. Master shaft 71 is operatively connected with shaft 63 through bevel gears 72 or any other suitable means. It is, of course, also possible to provide any other source of power for shaft 71.

The stapling machine 40 is controlled by a cam 73. This cam cooperates with a roller 74 which is carried by a rod 75. Rod 75 is slidably mounted in a bearing 76 and pivotally connected with a second rod 77. Rod 77, in turn, engages directly or indirectly through rods 78 and 79 clutch 80 of stapling machine 40. It is obvious from the drawings, particularly Figure 7, that a rotation of cam 73 will cause an actuation of clutch 80 which serves to operate stapling machine during certain intermittent periods. Shape, position and movements of cam 73 and the control mechanism controlled by the cam are timed and adjusted to secure an operation of stapling machine 40 while a stick 11 is in a position ready to be fastened to strip 10.

The operation of sharpening or pointing device 44 is controlled by a second cam 81. Cam 81 cooperates with one arm of a bell crank 82 which is pivotal about pivot 83. The other arm of bell crank 82 is linked to a rod 84, which, in turn, is pivotally connected to a frame 85. Frame 85 carries two guiding arms 86 and 87 which are slidably supported by stationary frame 47 secured to standard 26. Arm 86 carries motor 46 which is secured to arm 86 by any suitable means, for example, bolts or rivets 88. By a lateral movement of slidable frame, motor 46 and with it revolving head 45 will be moved toward wheel 24 and away from it. A coil spring 89 tends to move motor 46 toward wheel 24. A stop 90 serves to limit the movement of motor 46 and its revolving head toward wheel 24.

As it is apparent from the drawing, a rotation of cam 81 will cause a swinging movement of rocker 82 which, in turn, will cause a lateral movement of motor 46 and revolving head 45 toward wheel 24 until revolving head 45 engages a stick 11 and sharpens it.

Shape, position and rotation of cam 81 are timed and adjusted in such a manner that revolving head 45 is in an operative position when a stick has reached a position opposite to head 45. An abutment 91 is preferably provided to secure a stick in its position against the pressure of revolving head.

A third cam 92 serves to control the cutting device. Cam 92 cooperates with a roller 93 which is carried by axially slidable rod 55. As it is apparent from the drawing, a rotation of cam 92 will cause a reciprocating movement of rod 55 against the strength of spring 62. By this reciprocating movement rotating cutting knife 49 is brought into and out of operative contact with strip 10.

Position, shape and rotation of cam 92 are timed and adjusted to bring cutting knife 49 into operative contact with strip 10 when the position of strip 10 is substantially the one indicated in Figure 4.

All cams and control mechanisms actuated by them are timed and adjusted to secure that various work devices and tools are in operation while wheel 24 is standing still.

After the strip 10 has been cut into individual pads, each secured to a sharpened stick 11, the applicators continue to travel on wheel 24 until they reach the end of guiding belt 36, whereupon they drop into a suitable storage container (not shown in the drawings).

In order to secure corks 17, which serve as handles for the applicators and as covers for bottles or cans, to sharpened sticks 11, each stick may be inserted into a frame 19, as shown in Figure 5 and described in connection with this figure. Frames 19 may be placed on a conveyor, for example, a stepwise and intermittently rotating wheel similar to wheel 24. In certain positions of this conveyor pusher 21 will push cork 17 against the padded end of the applicator thus causing the sharpened end of stick 11 to penetrate into the cork. Various conventional devices are known to secure such operation. The movement of pusher 21 can be controlled by cams as described in connection with the previous operations.

My invention is not limited to the embodiment shown in the drawings, but various changes and alterations may be made without departing from the scope of my invention.

What I claim is new and desire to be secured by Letters Patent is as follows:

1. A method of manufacturing applicators of the class described for applying pasty and liquid substances comprising the steps of providing a strip of absorbent material, of folding said strip longitudinally, of inserting sticks adapted for applicators spaced apart into a fold of said strip of absorbent material, of fastening one end of said sticks to said strip, of sharpening the other end of each of said sticks and of dividing said strip into individual pads, each attached to a stick.

2. A method of manufacturing applicators of the class described for applying pasty and liquid substances comprising the steps of providing a strip of absorbent material, of folding said strip longitudinally, of inserting sticks adapted for applicators spaced apart into a fold of said strip of absorbent material, of fastening one end of said sticks to said strip, of sharpening the other end of each of said sticks and of dividing said strip into individual pads, each attached to a stick, and of inserting each of said sticks with its sharpened end into a handle adapted to be used as a cover for a container.

3. A machine for manufacturing applicators of the class described for applying liquid and pasty masses comprising a conveyor including a plurality of recesses adapted to accommodate applicator sticks, means for feeding applicator sticks to said conveyor, means for moving said conveyor, means for guiding and folding a strip of absorbent material, means for feeding a strip of absorbent material to said guiding and folding means, means for inserting one end of each of said sticks into a fold of said strip formed by said guiding and folding means, means for fastening one end of each of said sticks to said strip and a cutting device dividing said strip into individual pads, each secured to a stick, said guiding and folding means, said means for inserting said sticks between a fold of said strip, said fastening means and said cutting means being arranged along the path of travel of said conveyor.

4. A machine for manufacturing applicators of the class described for applying liquid and pasty masses comprising a conveyor including a plurality of recesses adapted to accommodate applicator sticks, means for feeding sticks to said conveyor, means for moving said conveyor, means for guiding and folding a strip of absorbent material, means for feeding a strip of absorbent material to said guiding and folding means, means for inserting one end of each of said sticks into a fold of said strip formed by said guiding and folding means, a device for fastening one end of each of said sticks to said strip and a cutting device dividing said strip into individual pads, each secured to a stick, a sharpening device for pointing the other end of each of said sticks, said guiding and folding means, said means for inserting said sticks between a fold of said strip, said fastening device, said cutting device and said sharpening device being arranged along the path of travel of said conveyor.

5. A machine for manufacturing applicators of the class described for applying liquid and pasty masses comprising a conveyor including a plurality of recesses adapted to accommodate sticks suitable for applicators, means for feeding sticks to said conveyor, means for moving said conveyor stepwise and intermittently, means for folding and guiding a strip of absorbent material, means for feeding a strip of absorbent material to said guiding and folding means, means for inserting one end of each of said sticks into a fold of said strip formed by said guiding and folding means, a device for fastening one end of each of said sticks to said strip and a cutting device dividing said strip into individual pads, each secured to a stick, said guiding and folding means, said means for inserting said sticks between a fold of said strip, said fastening device and said cutting device being arranged along the path of travel of said conveyor, and control means for actuating said fastening device and said cutting device while said conveyor is standing still between two steps.

6. A machine for manufacturing applicators of the class described for applying liquid and pasty masses comprising a rotatable conveyor wheel having a plurality of recesses on its periphery for accommodating sticks suitable for said applicators, means for feeding sticks to said conveyor, means for guiding and folding a strip made of absorbent material and fed to said guiding and folding means over one end of each of said sticks, a stapling device for fastening the covered end of each stick to said strip, a cutting device for cutting said strip into individual pads each secured to a stick, said guiding and folding means, said stapling device and said cutting device being arranged along the path of travel of said sticks carried by said wheel, means for rotating said wheel stepwise and intermittently and means for actuating said stapling device and said cutting device while said wheel is standing still between two steps.

7. A machine for manufacturing applicators of the class described for applying liquid and pasty masses comprising a rotatable conveyor wheel having a plurality of recesses on its periphery for accommodating sticks suitable for said applicators, means for feeding sticks to said conveyor, means for guiding and folding a strip made of absorbent material and fed to said guiding and folding means over one end of each of said sticks, a stapling device for fastening the covered end of each stick of said strip, a sharpening device for sharpening the other end of each of said sticks, a cutting device for cutting said strip into individual pads each secured to a stick, said guiding and folding means, said stapling device, said sharpening device and said cutting device being arranged along the path of travel of said sticks carried by said wheel, means for rotating said wheel stepwise and intermittently and means for actuating said stapling device, said sharpening device and said cutting device while said wheel is standing still between two steps.

8. A machine for manufacturing applicators of the class described for applying liquid and pasty masses comprising a rotatable conveyor wheel having a plurality of recesses on its periphery for accommodating sticks suitable for said applicators, means for feeding sticks to said conveyor, means for guiding and folding a strip made of absorbent material and fed to said guiding and folding means over one end of each of said sticks, a stapling device for fastening the covered end of each stick to said strip, a sharpening device for sharpening the other end of each of said sticks, a cutting device for cutting said strip into individual pads each secured to a stick, said guiding and folding means, said stapling device, said sharpening device and said cutting device being arranged along the path of travel of said sticks carried by said wheel, means for rotating said wheel stepwise and intermittently and means for actuating said stapling device, said sharpening device and said cutting device while said wheel is standing still between two steps and means for inserting each of said sticks with its sharpened end into a handle to be used as a cover for a container.

SEBASTIAN PILUSO.